(12) United States Patent
Tanju et al.

(10) Patent No.: US 11,739,693 B2
(45) Date of Patent: Aug. 29, 2023

(54) METHOD AND SYSTEM FOR GLOW PLUG OPERATION

(71) Applicant: PRATT & WHITNEY CANADA CORP., Longueuil (CA)

(72) Inventors: Mehmet Celal Tanju, Kanata (CA); Richard Freer, Saint-Basile-le-Grand (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 16/951,187

(22) Filed: Nov. 18, 2020

(65) Prior Publication Data

US 2022/0154647 A1 May 19, 2022

(51) Int. Cl.
*F02P 19/02* (2006.01)
*F02C 7/266* (2006.01)
*F02C 9/00* (2006.01)
*F23Q 7/00* (2006.01)

(52) U.S. Cl.
CPC ............ *F02C 7/266* (2013.01); *F02C 9/00* (2013.01); *F02P 19/021* (2013.01); *F02P 19/025* (2013.01); *F23Q 7/00* (2013.01); *F05D 2240/35* (2013.01); *F05D 2260/99* (2013.01); *F05D 2270/303* (2013.01)

(58) Field of Classification Search
CPC ......... F02P 19/021; F02P 19/025; F23Q 7/00; F16F 1/00
USPC ................ 123/145 A; 361/247, 264, 265
See application file for complete search history.

(56) References Cited

U.S. PATENT DOCUMENTS

| 4,402,663 A | 9/1983 | Romanelli |
| 4,516,543 A * | 5/1985 | Abe ............... F02P 19/025 |
| | | 123/145 A |

(Continued)

FOREIGN PATENT DOCUMENTS

| DE | 102008002574 A1 | 1/2010 |
| EP | 2653714 A1 | 10/2013 |

(Continued)

OTHER PUBLICATIONS

European Patent Office, Communication re. extended European search report for European patent application No. 21208855.3, dated Apr. 14, 2022.

(Continued)

*Primary Examiner* — Logan M Kraft
*Assistant Examiner* — Joshua Campbell
(74) *Attorney, Agent, or Firm* — Norton Rose Fulbright Canada LLP

(57) ABSTRACT

There are described methods and systems for operating a glow plug. The method comprises monitoring a glow plug current; applying a nominal voltage $V_N$ to the glow plug when the glow plug current is between an upper threshold $I_1$ and a lower threshold $I_2<I_1$; applying a voltage $V_H>V_N$ to the glow plug when the glow plug current exceeds the upper threshold $I_1$; and applying substantially no voltage to the glow plug when the glow plug current falls below the lower threshold $I_2$.

20 Claims, 7 Drawing Sheets

(56) References Cited

U.S. PATENT DOCUMENTS

| | | | | |
|---|---|---|---|---|
| 4,594,975 A * | 6/1986 | Shigenobu | ............ | F02P 19/022 |
| | | | | 123/145 A |
| 5,122,968 A * | 6/1992 | Bauer | ............ | F02P 7/035 |
| | | | | 219/486 |
| 6,217,312 B1 * | 4/2001 | Levinson | ............ | F23Q 7/10 |
| | | | | 361/264 |
| 6,635,851 B2 * | 10/2003 | Uhl | ............ | F02P 19/025 |
| | | | | 219/544 |
| 7,881,851 B2 | 2/2011 | Kernwein | | |
| 7,950,378 B2 | 5/2011 | Casasso et al. | | |
| 8,022,336 B2 | 9/2011 | Casasso et al. | | |
| 9,163,605 B2 | 10/2015 | Sackmann et al. | | |
| 9,488,153 B2 | 11/2016 | Bleil et al. | | |
| 9,816,478 B2 | 11/2017 | Rapp et al. | | |
| 2002/0043524 A1 * | 4/2002 | Taniguchi | ............ | F02P 19/025 |
| | | | | 219/544 |
| 2009/0289048 A1 * | 11/2009 | Casasso | ............ | F02P 19/022 |
| | | | | 219/262 |
| 2009/0316328 A1 * | 12/2009 | Kernwein | ............ | F02P 19/025 |
| | | | | 123/145 A |
| 2010/0286895 A1 * | 11/2010 | Bauer | ............ | F02P 19/027 |
| | | | | 73/114.62 |
| 2011/0221422 A1 | 9/2011 | Gonder | | |
| 2014/0266426 A1 * | 9/2014 | Vinayak | ............ | H03F 1/0233 |
| | | | | 330/127 |
| 2015/0311795 A1 * | 10/2015 | Yang | ............ | H02M 3/156 |
| | | | | 323/271 |
| 2019/0013651 A1 | 1/2019 | Michael | | |
| 2022/0154647 A1 | 5/2022 | Tanju | | |

FOREIGN PATENT DOCUMENTS

| | | | | |
|---|---|---|---|---|
| EP | 2728257 A2 | 5/2014 | | |
| EP | 2800451 A1 | 11/2014 | | |
| EP | 2572099 B1 | 3/2018 | | |
| JP | S5762966 A | 4/1982 | | |
| JP | S57159963 A | 10/1982 | | |
| JP | S59103970 A | 6/1984 | | |
| WO | WO-9506203 A1 * | 3/1995 | ............ | F02P 19/025 |

OTHER PUBLICATIONS

European Patent Office, Communication re. extended European search report for European patent application No. 22200143.0, dated Feb. 24, 2023.

* cited by examiner

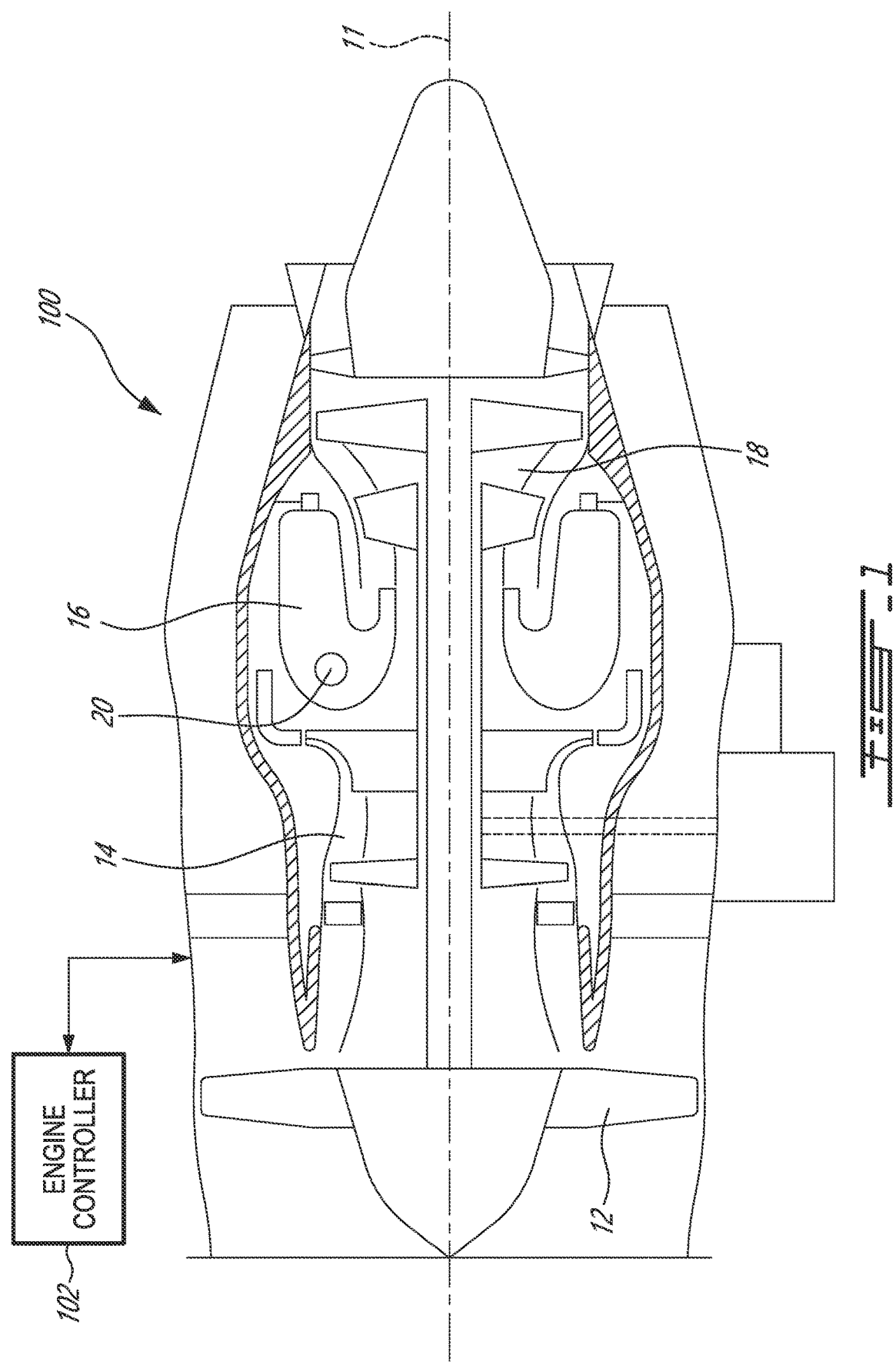

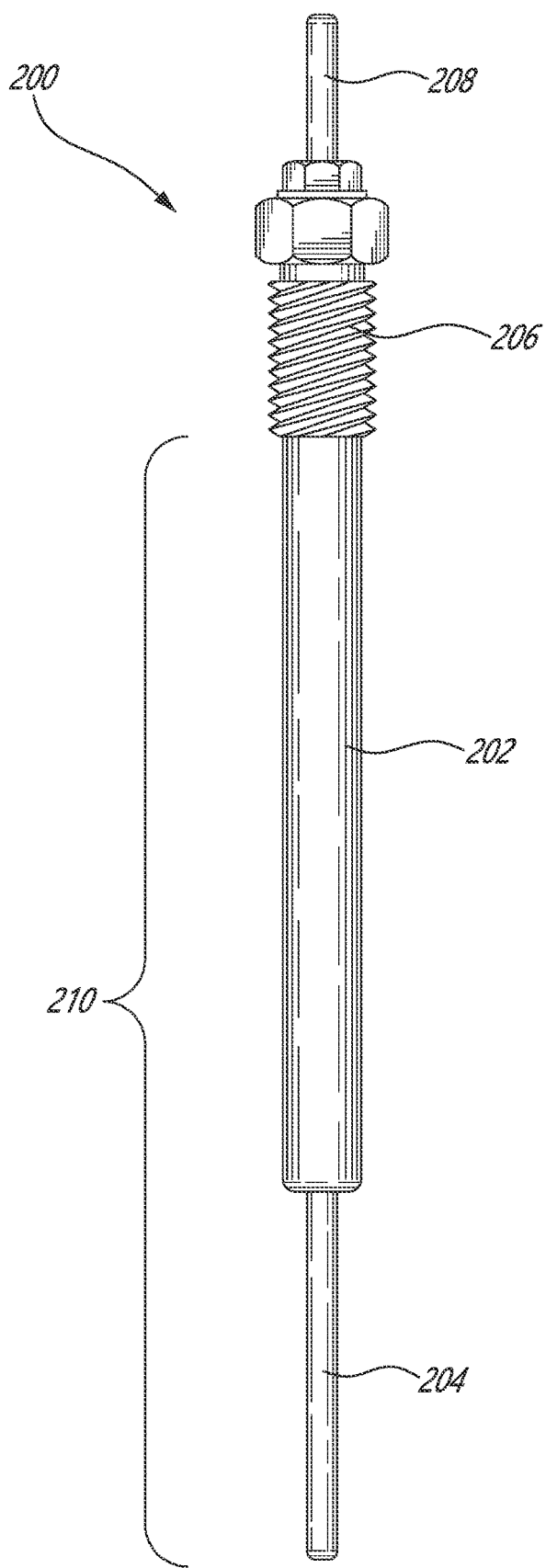

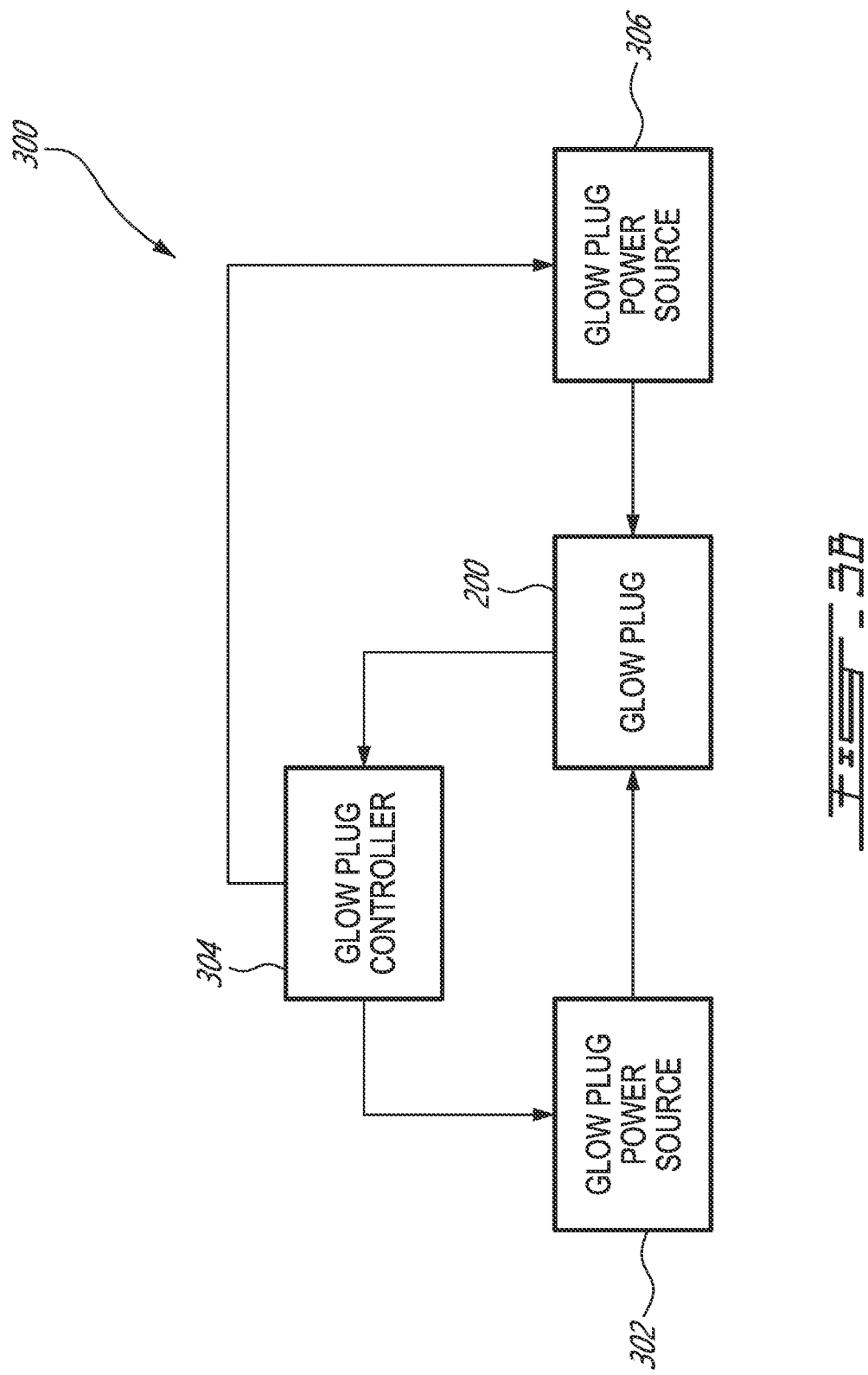

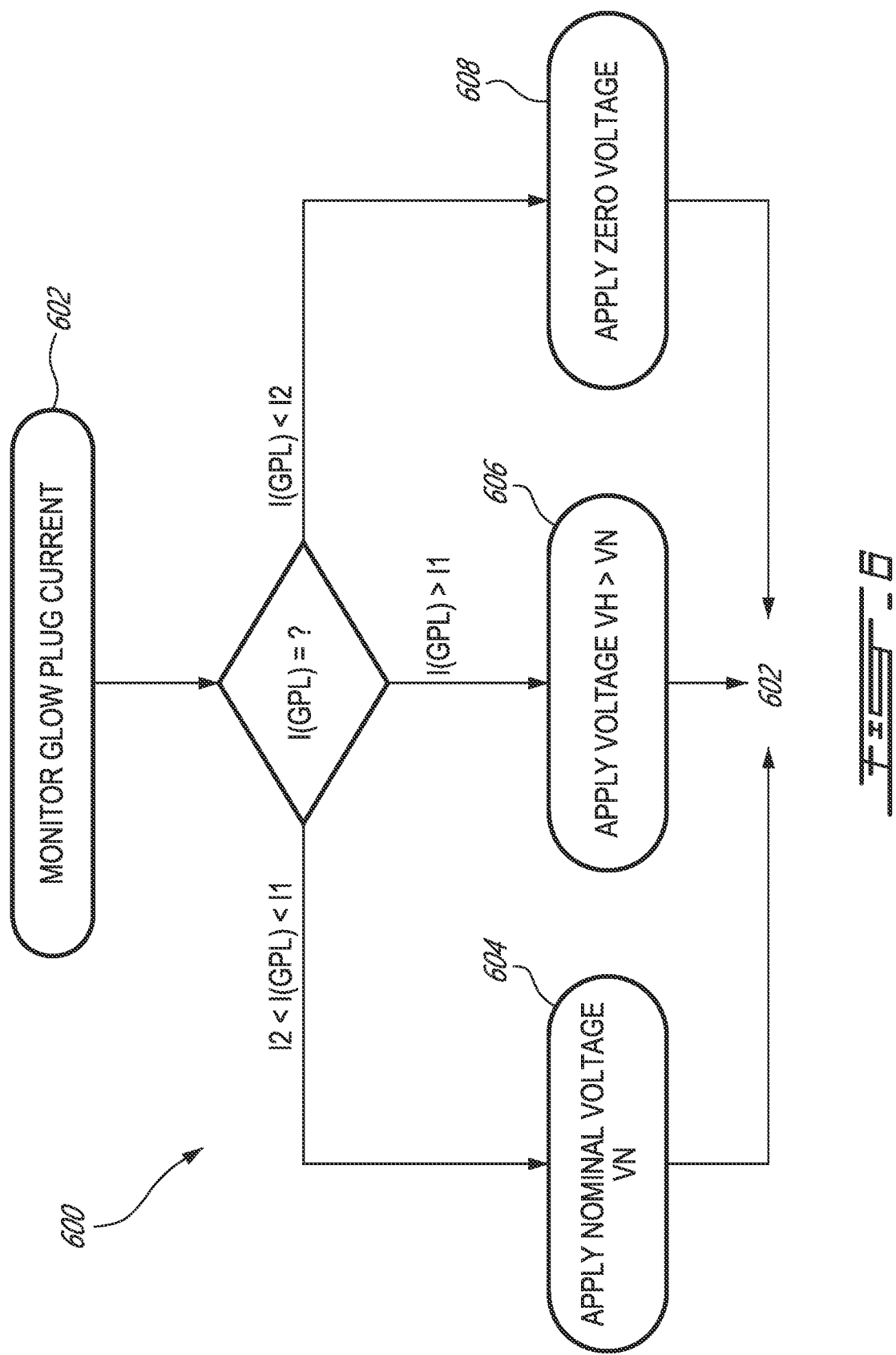

METHOD AND SYSTEM FOR GLOW PLUG OPERATION

TECHNICAL FIELD

The application relates generally to glow plugs and, more particularly, to temperature management of a glow plug in operation.

BACKGROUND OF THE ART

Glow plugs are commonly used to ignite a mixture of air and fuel in a combustor of gas turbine engines. However, glow plugs have drawbacks. For instance, the glow plugs have been known to achieve less than full reliability in conditions such as when the fuel and the engine are very cold or when the environment gets too hot. Cost is also a factor. There is always room for improvement.

SUMMARY

In one aspect, there is provided a method for operating a glow plug. The method comprises monitoring a glow plug current; applying a nominal voltage $V_N$ to the glow plug when the glow plug current is between an upper threshold $I_1$ and a lower threshold $I_2 < I_1$; applying a voltage $V_H > V_N$ to the glow plug when the glow plug current exceeds the upper threshold $I_1$; and applying substantially no voltage to the glow plug when the glow plug current falls below the lower threshold $I_2$.

In another aspect, there is provided a glow plug system comprising a glow plug having a body, a glowing end extending from the body, and a connecting end opposite to the glowing end; at least one glow plug power source operatively connected to the connecting end of the glow plug for applying a voltage thereto; and a glow plug controller coupled to the glow plug and the at least one glow plug power source. The glow plug controller is configured for monitoring a glow plug current; applying a nominal voltage $V_N$ to the glow plug when the glow plug current is between an upper threshold $I_1$ and a lower threshold $I_2 < I_1$; applying a voltage $V_H > V_N$ to the glow plug when the glow plug current exceeds the upper threshold $I_1$; and applying substantially no voltage to the glow plug when the glow plug current falls below the lower threshold 12.

In yet another aspect, there is provided a glow plug control system comprising a processing unit and a one non-transitory computer-readable medium having stored thereon program instructions. The program instructions are executable by the processing unit for monitoring a glow plug current; applying a nominal voltage $V_N$ to the glow plug when the glow plug current is between an upper threshold $I_1$ and a lower threshold $I_2 < I_1$; applying a voltage $V_H > V_N$ to the glow plug when the glow plug current exceeds the upper threshold $I_1$; and applying substantially no voltage to the glow plug when the glow plug current falls below the lower threshold 12.

DESCRIPTION OF THE DRAWINGS

Reference is now made to the accompanying figures in which:

FIG. 1 is a schematic cross sectional view of a gas turbine engine;

FIG. 2 is a schematic diagram of an example glow plug;

FIGS. 3A and 3B are block diagrams of examples of glow plug systems;

FIG. 6 is a flow chart of an example method for operating a glow plug.

DETAILED DESCRIPTION

Figure 3A:
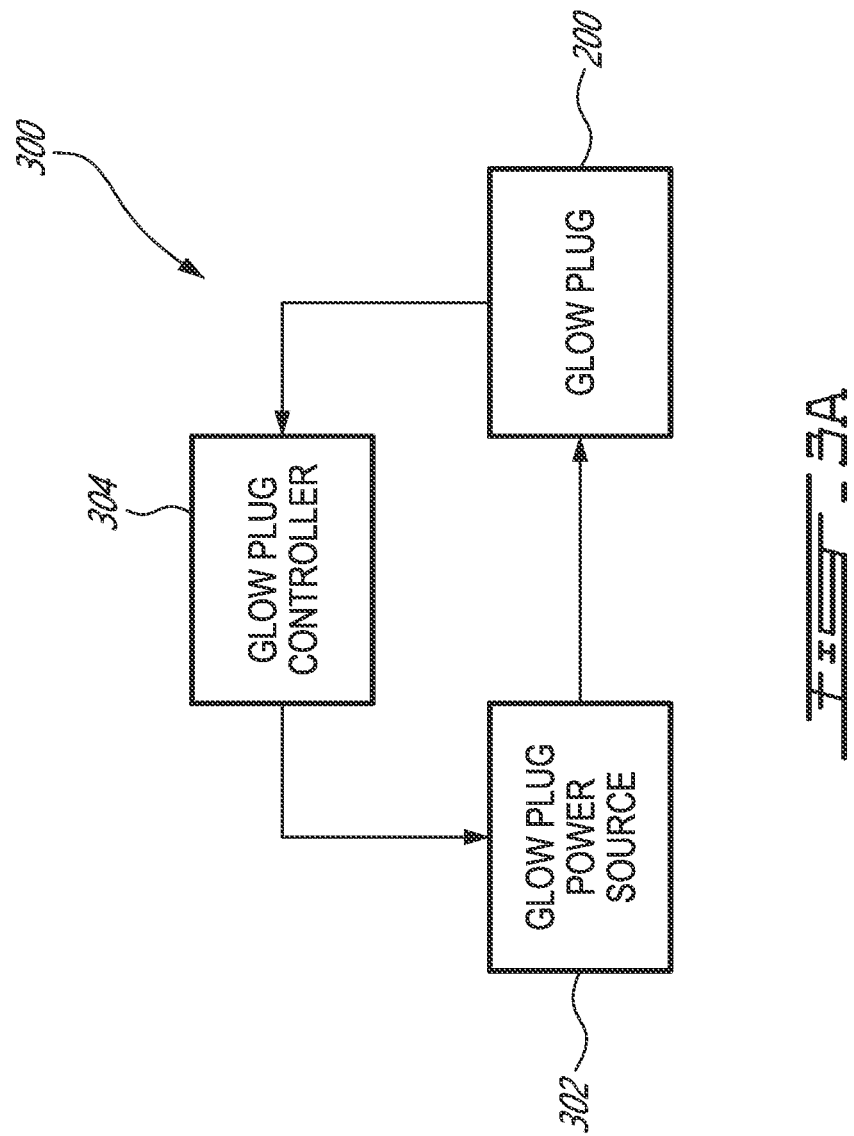

There is described herein a glow plug system and a method for operating a glow plug. In some embodiments, the glow plug is used to ignite an engine, such as a gas turbine engine. Alternatively, the glow plug may be used for any type of application requiring such a heating element. FIG. 1 illustrates a gas turbine engine 10 of a type provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 rotate about a central axis 11. The combustor 16 defines at least one aperture 20 for receiving at least one glow plug 200 (FIG. 2) for igniting the mixture of compressed air and fuel.

Control of the operation of the engine 100 can be effected by one or more control systems, for example an engine controller 102, which is communicatively coupled to the engine 100. The engine controller 102 can modulate a fuel flow provided to the engine 100, the position and orientation of variable geometry mechanisms within the engine 100, a bleed level of the engine 100, and the like, based on predetermined schedules or algorithms. In some embodiments, the engine controller 102 includes one or more FADEC(s), electronic engine controller(s) (EEC(s)), or the like, that are programmed to control the operation of the engine 100. The operation of the engine 100 can be controlled by way of one or more actuators, mechanical linkages, hydraulic systems, and the like. The engine controller 102 can be coupled to the actuators, mechanical linkages, hydraulic systems, and the like, in any suitable fashion for effecting control of the engine 100.

Although illustrated as a turbofan engine, the gas turbine engine 100 may alternatively be any other type of engine for which a glow plug may be used for ignition, for example a turboshaft engine or a turboprop engine. Other types of engines, such as a diesel engine or a Wankel rotary combustion engine, may also apply. The engine 100 may be for flight applications, industrial applications, or the like.

Referring to FIG. 2, the glow plug 200 has a body 202 and a glowing end 204 extending from the body 202. The glowing end 204 becomes hot during use to ignite the mixture of gas and air. The body 202 may define a threaded portion 206 to be threadingly engaged to the aperture 20 defined through the combustor 16 of the engine 100. The glow plug 200 has a connecting end 208 opposite to the glowing end 204 for connection to a source of power.

The body 202 and glowing end 204 together form an electric heat generating member 210 having a resistance R. In some embodiments, the resistance R has a constant resistance component $R_c$ that is temperature independent, and a varying resistance component $R_v$ that is temperature dependent. The two components are connected in series such that:

$$R = R_c + R_v \qquad (1)$$

The constant resistance component $R_c$ is generally very low. The varying resistance component $R_v$ varies with a resistor temperature coefficient $\alpha$ and a temperature T of the glow plug, such that equation (1) becomes:

$$R = R_c + \alpha T \quad (2)$$

The resistor temperature coefficient $\alpha$ is constant from one glow plug to another having been made with a same manufacturing process and materials, and differs from one glow plug to another having been made from different manufacturing processes and/or different materials. The constant resistance component $R_c$ may vary between acceptable limits from one glow plug to another having been made with a same manufacturing process and materials.

Referring to FIG. 3A, there is illustrated an example embodiment of a glow plug system 300. The glow plug 200 is powered by a glow plug power source 302, which may be a power supply, a battery, or any other device capable of providing at least two fixed voltage levels to the glow plug 200. A glow plug controller 304 is coupled to the glow plug power source 302 and applies a glow plug temperature control strategy that uses the glow plug current I(GPL) flowing into the glow plug 200 as a temperature detection mechanism and adapts the glow plug voltage V(GPL) applied to the glow plug 200 by the glow plug power source 302 accordingly.

Since the constant resistance component $R_c$ and the resistor temperature coefficient $\alpha$ are constant, the total glow plug resistance R will be constant for a given temperature T. If the glow plug 200 is powered with a first, nominal constant voltage $V_N$, then the glow plug current I(GPL) at the minimum threshold temperature T1, will be a first value Ix. Threshold $I_1$ should be set at a value that corresponds to Ix, to account for effects that might decrease the resistance and thereby increase current, such as plug to plug variation and external cooling effects. Similarly, if the glow plug 200 is powered with $V_N$ at a maximum threshold temperature T2 (which can be higher than T1 or it can be the same as T1), will be a second value Iy. Threshold $I_2$ should be set at a value that corresponds to Iy, to account for effects that might increase the resistance and thereby decrease current, such as plug to plug variation and external heating effects. As long as the glow plug current I(GPL) is kept within $I_1$ and $I_2$, the glow plug temperature T will be protected from overheating.

Generally, the glow plug controller 304 is configured to monitor the glow plug current I(GPL) and to make a control decision based on the glow plug current I(GPL). There are three possible actions, depending on the value of the glow plug current I(GPL). When the glow plug current is between an upper threshold $I_1$ and a lower threshold $I_2$, a nominal voltage $V_N$ is applied to the glow plug 200 by the glow plug power source 302. If the nominal voltage $V_N$ is already applied to the glow plug 200, then $V_N$ is maintained.

When the glow plug current exceeds the upper threshold $I_1$, a voltage $V_H > V_N$ is applied to the glow plug 200. Indeed, when I(GPL) exceeds I1, this is indicative that the glow plug temperature T is low (for a constant voltage) and the temperature should be increased. The higher voltage $V_H$ causes the temperature T of the glow plug to increase, based on:

$$V = I * R \quad (3)$$

where R can be replaced with equation (2) to get:

$$V = I * (R_c + \alpha T) \quad (4)$$

Therefore, if V increases, T will also increase. When the glow plug current falls below the lower threshold $I_2$, substantially no voltage is applied to the glow plug 200. Indeed, the low I(GPL) is indicative that the glow plug temperature T is high (for a constant voltage) and the temperature should be decreased. Applying substantially zero volts (or removing any voltage application) causes the temperature T of the glow plug to decrease, based on equations (3) and (4) above. It will be understood that the expression "substantially no voltage" encompasses applying a very low voltage, such as 0.1 V or another low value having a substantially same effect as applying zero volts.

In some embodiments, the difference between the upper threshold $I_1$ and the lower threshold $I_2$ is less than or equal to a given percentage of the current $I_1$, such as 50%. For example, the upper threshold $I_1$ is set to 4 A and the lower threshold $I_2$ is set to 2 A, such that the difference is 2 A, which is 50% of $I_1$. In some embodiments, the upper and lower thresholds are set so as to have a given difference, such as 3 A, 2 A, 1 A, 0.5 A, 0.25 A, 0.1 A, or 0.05 A. Other embodiments may also apply depending on practical implementations.

In some embodiments, the upper and lower current thresholds $I_1$, $I_2$ are selected based on a predicted resistance of the glow plug 200 at a desired threshold temperature T1, T2, respectively. In some other embodiments, the upper and lower current thresholds $I_1$, $I_2$ are selected based on a predicted current at target temperatures (which may differ from the threshold temperatures T1, T2), for example this might be used if some margin relative to the maximum and minimum temperature limits is desired.

In some embodiments, all voltage levels, i.e. $V_N$, $V_H$ and substantially zero volts are applied through the glow plug power source 302. For example, the glow plug controller 304 may instruct the glow plug power source 302 to apply $V_N$, $V_H$ or 0 volts (i.e. no voltage) as a function of the monitored glow plug current I(GPL).

In some embodiments, and as illustrated in FIG. 3B, the glow plug power source 302 is operable only at $V_N$ and another power source 306 is operable at $V_H$. In this case, the glow plug power source 302 may be an on/off type power source that toggles between $V_N$ and substantially zero volts, and the glow plug power source 306 may be an on/off type power source that toggles between $V_H$ and substantially zero volts.

In some embodiments, the glow plug power source 302 remains on even when the glow plug power source 306 is turned on, such that toggling the glow plug power source 306 on/off causes the glow plug voltage V(GPL) to toggle between $V_H$ and $V_N$.

In some embodiments, applying the higher voltage $V_H$ to increase the glow plug temperature T comprises toggling between the voltage $V_H$ and the voltage $V_N$ in order to ensure that the current observed at $V_N$ can be periodically compared to thresholds I1 and I2 and the glow plug temperature T increases in a controlled manner and remains under control. Toggling may be done pseudo-randomly or at a given rate with a fixed pulse duration until the monitored glow plug current I(GPL) measured at $V_N$ falls below the upper threshold $I_1$. Using the embodiment of FIG. 3A, toggling between $V_H$ and $V_N$ comprises instructing the glow plug power source 302 to alternatively apply $V_H$ and $V_N$. Using the embodiment of FIG. 3B, toggling between $V_H$ and $V_N$ comprises turning the glow plug power source 306 on/off repeatedly while maintaining the glow plug power source 302 on. Other embodiments may also apply.

In some embodiments, substantially zero volts (or no voltage) is applied to the glow plug 200 for a pre-determined or estimated amount of time in order to cause the temperature T to decrease. However, when there is no voltage applied to the glow plug 200 there is also no current to monitor. Therefore, applying substantially no voltage to the glow plug 200 may, in some embodiments, comprise toggling between substantially no voltage and $V_N$ in order to periodically compare the current at $V_N$ with thresholds $I_1$ and $I_2$, to ensure that the glow plug temperature decreases in a controlled manner and does not get too hot. This helps to ensure that the glow plug life exceeds an expected minimum number of cycles and expected minimum total duration of operation. This also helps to ensure that the glow plug does not get too cold before $V_N$ is once again applied, which can improve the ability of the system to successfully ignite the engine. Toggling may be performed pseudo-randomly or using a given rate with a fixed pulse duration until the monitored glow plug current I(GPL) exceeds the lower threshold $I_2$ when $V_N$ is applied. Using the embodiment of FIG. 3A, toggling between substantially zero volts and $V_N$ comprises instructing the glow plug power source 302 to alternately apply no voltage and $V_N$. Using the embodiment of FIG. 3B, toggling between substantially zero volts and $V_N$ comprises turning the power source 302 on/off repeatedly while maintaining the glow plug power source 306 off. Other embodiments may also apply.

Figure 4:
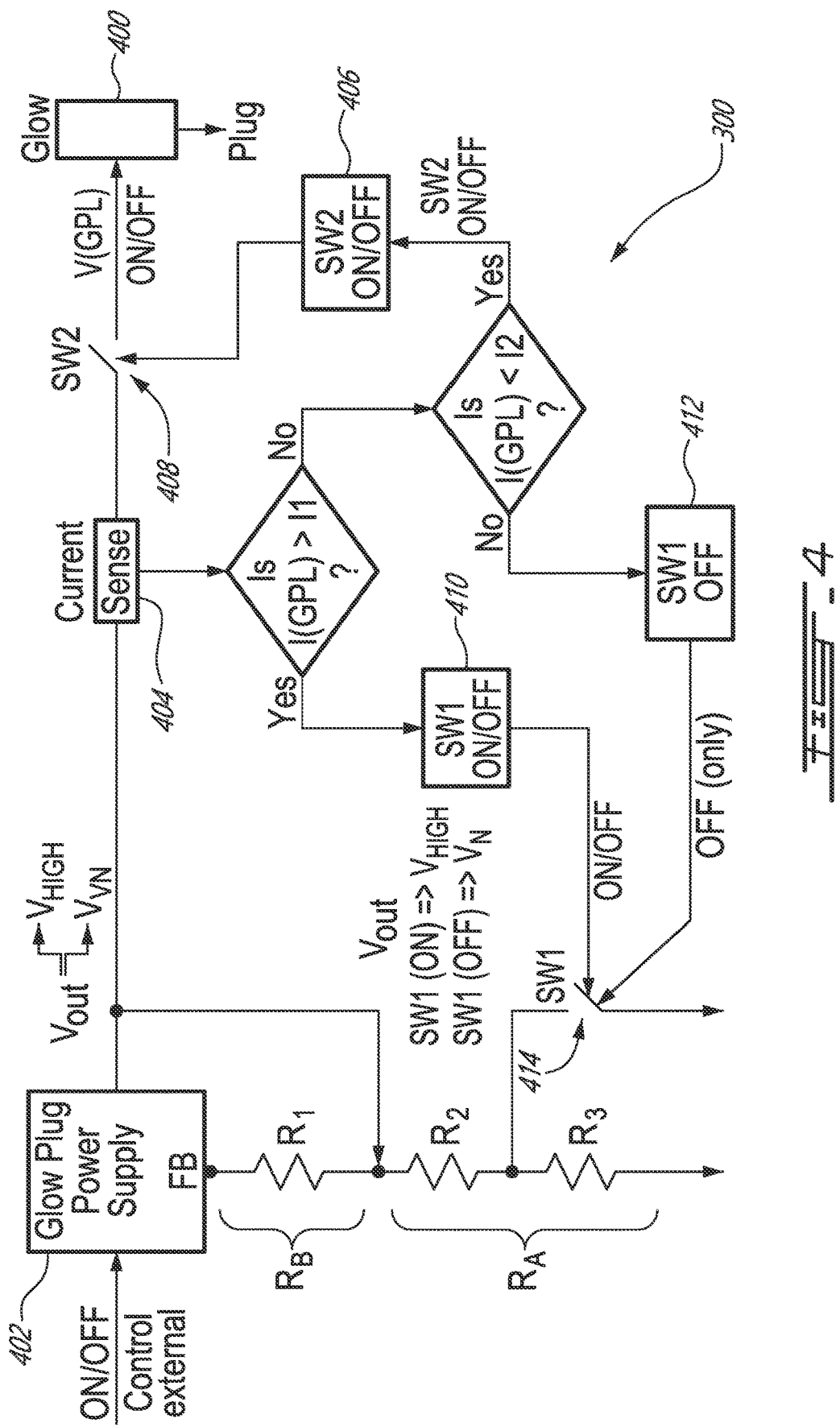
FIG. 4 is a diagram of an example implementation of a glow plug system.

Referring to FIG. 4, there is illustrated a specific and non-limiting example for implementation of the glow plug system 300. A glow plug 400 is operatively coupled to a glow plug power supply 402. An on/off external control turns the power supply 402 on and off. Three resistors R1, R2, R3 are connected in series between the glow plug power supply 402 and ground, and are used to set the output voltage $V_{out}$ of the power supply 402, where $$V_{out} \propto \left(\frac{R_B}{R_A}\right) \qquad (5)$$

As shown in the FIG. 4, $R_A$=R2+R3 and $R_B$=R1. Depending on the position of switch 414, $V_{out}$ may be set to $V_N$ or $V_H$. When switch 414 is on (i.e. closed), $V_{out}$=$V_H$; when switch 414 is off (i.e. open), $V_{out}$=$V_N$. When switch 408 is on (i.e. closed), V(GPL)=$V_{out}$. When switch 408 is off (i.e. opened), V(GPL)=0. Therefore, the various configurations of switches 408, 414 cause V(GPL) to be set to any one of $V_N$, $V_H$, and substantially zero V.

A current sensor 404 monitors the glow plug current I(GPL) flowing into the glow plug 400. In an example embodiment, the current sensor 404 is a resistor, but any device that detects electric current in a wire and generates a signal proportional to that current may be used. The generated signal may be analog or digital. If the sensed current is greater than the upper threshold $I_1$, switch 414 is closed (i.e. turned on) via switch controller 410 so that V(GPL)=$V_{out}$=$V_H$ in order to cause the temperature T of the glow plug 400 to increase. If, when $V_N$ is applied, the sensed current is not greater than the upper threshold $I_1$ and is not lower than the lower threshold $I_2$, switch 414 is held open via switch controller 412 so that V(GPL)=$V_{out}$=$V_N$. If the sensed current is not greater than the upper threshold $I_1$ and is lower than the lower threshold $I_2$, switch 408 is opened (i.e. turned off) via switch controller 406 such that V(GPL)=0.

Figure 5:
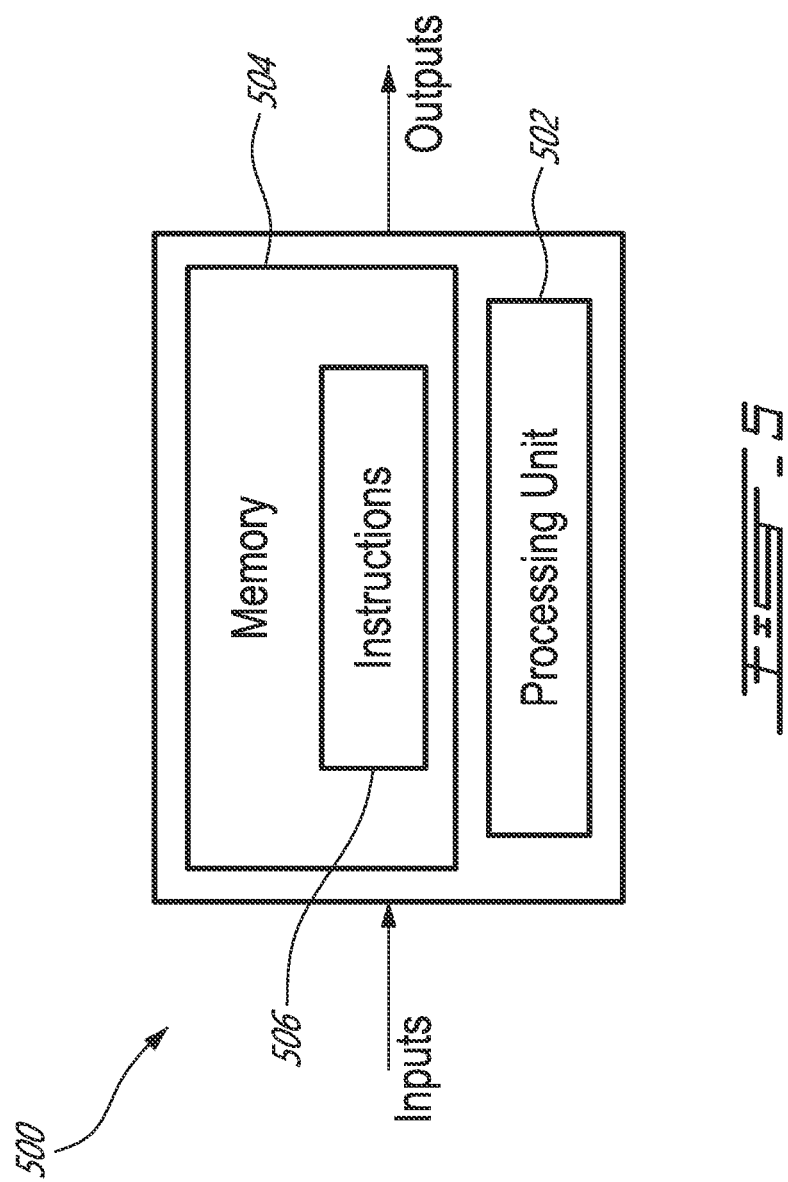
FIG. 5 is a block diagram of an example computing device.

It will be understood that the glow plug assembly 300 may be implemented in various ways and that the example of FIG. 4 is one such way. In some embodiments, the glow plug controller 304 is implemented in one or more computing device 500, as illustrated in FIG. 5. For simplicity only one computing device 500 is shown but the system may include more computing devices 500 operable to exchange data. The computing devices 500 may be the same or different types of devices. Note that the controller 304 can be implemented as part of a full-authority digital engine controls (FADEC) or other similar device, including electronic engine control (EEC), engine control unit (ECU), avionics or cockpit equipment, electronic propeller control, propeller control unit, and the like. In some embodiments, the controller 304 is implemented as part of the engine controller 102, in part or in whole. In this manner, operation of the glow plug may be managed by an engine control system. Other embodiments may also apply.

The computing device 500 comprises a processing unit 502 and a memory 504 which has stored therein computer-executable instructions 506. The processing unit 502 may comprise any suitable devices configured to implement the method XX such that instructions 506, when executed by the computing device 500 or other programmable apparatus, may cause the functions/acts/steps performed as part of a method 600 as described in FIG. 6 to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

Referring to FIG. 6, a method 600 of operating a glow plug is described. At step 602, the glow plug current I(GPL) is monitored. When the glow plug current I(GPL) at $V_N$<$I_1$ and >$I_2$, a nominal voltage $V_N$ is continuously applied to the glow plug at step 604. When the glow plug current at $V_N$, I(GPL)>$I_1$, a voltage $V_H$>$V_N$ is applied to the glow plug at step 606. When the glow plug current at $V_N$, I(GPL)<$I_2$, no voltage (or substantially zero volts) is applied to the glow plug at step 608. After each one of steps 604, 606, 608, the method 600 loops back to step 602 to continue monitoring the glow plug current and apply the proper voltage in order to manage the temperature of the glow plug.

In some embodiments, applying the voltage $V_H$>$V_N$ to the glow plug at step 606 comprises toggling between the voltage $V_H$ and the voltage $V_N$ until the monitored glow plug current at $V_N$ falls below the upper threshold 11. In some embodiments, applying substantially no voltage to the glow plug at step 608 comprises toggling between substantially no voltage and the voltage $V_N$ until the monitored glow plug current at $V_N$ rises above the lower threshold $I_2$. In some embodiments, monitoring of the glow plug current I(GPL) at step 602 is only done while $V_N$ is applied.

Although the method 600 refers to "applying a voltage" to the glow plug, it will be understood that this expression includes applying the voltage via one or more power source as well as causing one or more power source to apply the voltage. The expression also includes causing one or more switches, such as the one illustrated in FIG. 4, to open and close in order to set the glow plug voltage V(GPL) to substantially zero or to $V_{out}$ as defined by a glow plug power supply. The method 600 may be performed by the glow plug controller 304 using an embodiment as illustrated in FIGS. 3A, 3B, 4, 5, a combination thereof, or any equivalents thereof.

It will be understood by those skilled in the art that the method 600 allows the temperature of the glow plug to be managed without any independent temperature feedback and without complex micro-processors to measure glow plug voltage. The glow plug assembly 300 may thus have lower costs, lower weight, and be more reliable due to lower component count and higher power supply efficiency. As stated above, glow plug management may also be integrated into an engine controller 102 of an engine 100, for example via a solenoid driver interface. In some embodiments, an internal processor of the engine controller 102 may also be used to provide gradually varying glow plug voltages to the glow plug. The method 600 does not require any calculations, such as resistance calculations or others, to manage the glow plug temperature. The method 600 does not require any feedback or input related to environmental and engine operating conditions to manage the glow plug temperature. The method 600 does not rely on any data to be provided by the engine controller 102 or any other device to manage the glow plug temperature.

In some embodiments, the upper threshold $I_1$ is associated with a maximum value for the resistance of the glow plug that limits the temperature T of the glow plug to a maximum temperature for the nominal voltage $V_N$, and the lower threshold $I_2$ is associated with a minimum value for the resistance of the glow plug that limits the temperature T of the glow plug to a minimum temperature for the nominal voltage $V_N$. As such, the upper and lower current thresholds may be set as a function of the value of the resistance of the glow plug.

For example, the glow plug temperature T may be centered at 1150° C., with the upper and lower temperature limits set above and below this value to 1200° C. and 1100° C., respectively. In some embodiments the maximum temperature is less than 1400° C. and the minimum temperature is greater than 1000° C. In some embodiments, the maximum temperature corresponds to a temperature that permits a cycle life of at least 200 cycles for the glow plug. Upper and lower glow plug current values may be associated with the upper and lower temperature values, for example 3.5 amps and 2.5 amps, respectively. These values are exemplary only and may differ, depending on practical implementations. In some embodiments, the lower temperature threshold is set to be high enough to initiate fuel air mixture ignition in the engine 100.

The method 600 for operating a glow plug and glow plug system 300 described herein may be implemented in a high level procedural or object oriented programming or scripting language, or a combination thereof, to communicate with or assist in the operation of a computer system, for example the computing device 500. Alternatively, the method 600 and system 300 may be implemented in assembly or machine language. The language may be a compiled or interpreted language. Program code for implementing the method 600 and system 300 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the method 600 and system 300 may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 600.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology.

For example, the glow plug may be used outside of an engine, or have a design that differs from that illustrated in FIG. 2. In another example, a plurality of glow plugs may be managed by a glow plug controller concurrently. Yet further modifications could be implemented by a person of ordinary skill in the art in view of the present disclosure, which modifications would be within the scope of the present technology.

The invention claimed is:

1. A method for operating a glow plug, the method comprising:
monitoring a glow plug current $I_{GPL}$ flowing into the glow plug when a glow plug voltage $V_{GPL}$ applied to the glow plug is equal to a nominal voltage $V_N$;
comparing the glow plug current $I_{GPL}$ to an upper threshold $I_1$, and a lower threshold $I_2$ that is less than the upper threshold $I_1$;
maintaining the glow plug voltage $V_{GPL}$ applied to the glow plug at the nominal voltage $V_N$ when the glow plug current $I_{GPL}$ is between the upper threshold $I_1$ and the lower threshold $I_2$;
increasing the glow plug voltage $V_{GPL}$ applied to the glow plug to a second voltage $V_H$ greater than the nominal voltage $V_N$ when the glow plug current $I_{GPL}$ exceeds the upper threshold $I_1$; and
decreasing the glow plug voltage $V_{GPL}$ applied to the glow plug to substantially no voltage when the glow plug current $I_{GPL}$ falls below the lower threshold $I_2$.

2. The method of claim 1, wherein increasing the glow plug voltage $V_{GPL}$ applied to the glow plug to the second voltage $V_H$ comprises toggling between the second voltage $V_H$ and the nominal voltage $V_N$ at a first rate with a fixed pulse duration until the monitored glow plug current $I_{GPL}$ observed at the nominal voltage $V_N$ falls below the upper threshold $I_1$.

3. The method of claim 1, wherein decreasing the glow plug voltage $V_{GPL}$ applied to the glow plug to substantially no voltage comprises toggling between substantially no voltage and the nominal voltage $V_N$ at a second rate with a fixed pulse duration until the monitored glow plug current $I_{GPL}$ observed at the nominal voltage $V_N$ rises above the lower threshold $I_2$.

4. The method of claim 1, wherein the upper threshold $I_1$ is set to a value that corresponds to a first current that results from applying the nominal voltage $V_N$ to the glow plug at a minimum temperature threshold, and the lower threshold $I_2$ is set to a value that corresponds to a second current that results from applying the nominal voltage $V_N$ to the glow plug at a maximum temperature threshold.

5. The method of claim 1, wherein the upper threshold $I_1$ is set to a value that is lower than a first current that results from applying the nominal voltage $V_N$ to the glow plug at a minimum temperature threshold, and the lower threshold $I_2$ is set to a value that is higher than a second current that results from applying the nominal voltage $V_N$ to the glow plug at a maximum temperature threshold.

6. The method of claim 5, wherein the maximum temperature threshold is less than 1400° C. and the minimum temperature threshold is greater than 1000° C.

7. The method of claim 5, wherein the maximum temperature threshold corresponds to a temperature that permits a cycle life of at least 200 cycles for the glow plug.

8. The method of claim 1, wherein increasing the glow plug voltage $V_{GPL}$ and decreasing the glow plug voltage $V_{GPL}$ each comprises switching between constant voltage levels.

9. The method of claim 1, wherein increasing the glow plug voltage $V_{GPL}$ and decreasing the glow plug voltage $V_{GPL}$ each comprises gradually varying the glow plug voltage $V_{GPL}$.

10. The method of claim 1, wherein a difference between the upper threshold $I_1$ and the lower threshold $I_2$ is one of 3 A, 2 A, 1 A, 0.5 A, 0.25 A, 0.1 A and 0.05 A.

11. A glow plug system comprising:
a glow plug having a body, a glowing end extending from the body, and a connecting end opposite to the glowing end;
at least one glow plug power source operatively connected to the connecting end of the glow plug for applying a voltage thereto; and
a glow plug controller coupled to the glow plug and the at least one glow plug power source and configured for:
monitoring a glow plug current $I_{GPL}$ flowing into the glow plug when a glow plug voltage $V_{GPL}$ applied to the glow plug is equal to a nominal voltage $V_N$;
comparing the glow plug current $I_{GPL}$ to an upper threshold $I_1$ and a lower threshold $I_2$ that is less than the upper threshold $I_1$;
maintaining the glow plug voltage $V_{GPL}$ applied to the glow plug at the nominal voltage $V_N$ when the glow plug current $I_{GPL}$ is between the upper threshold $I_1$ and the lower threshold $I_2$;
increasing the glow plug voltage $V_{GPL}$ applied to the glow plug to a second voltage $V_H$ greater than the nominal voltage $V_N$ when the glow plug current $I_{GPL}$ exceeds the upper threshold $I_1$; and
decreasing the glow plug voltage $V_{GPL}$ applied to the glow plug to substantially no voltage when the glow plug current $I_{GPL}$ falls below the lower threshold $I_2$.

12. The glow plug system of claim 11, wherein increasing the glow plug voltage $V_{GPL}$ applied to the glow plug to the second voltage $V_H$ comprises toggling between the second voltage $V_H$ and the nominal voltage $V_N$ at a first rate with a fixed pulse duration until the monitored glow plug current $I_{GPL}$ observed at the nominal voltage $V_N$ falls below the upper threshold $I_1$.

13. The glow plug system of claim 11, wherein decreasing the glow plug voltage $V_{GPL}$ applied to the glow plug to substantially no voltage comprises toggling between substantially no voltage and the nominal voltage $V_N$ at a second rate with a fixed pulse duration until the monitored glow plug current $I_{GPL}$ observed at the nominal voltage $V_N$ rises above the lower threshold $I_2$.

14. The glow plug system of claim 11, wherein the upper threshold $I_1$ is set to a value that corresponds to a first current that results from applying the nominal voltage $V_N$ to the glow plug at a minimum temperature threshold, and the lower threshold $I_2$ is set to a value that corresponds to a second current that results from applying the nominal voltage $V_N$ to the glow plug at a maximum temperature threshold.

15. The glow plug system of claim 11, wherein the upper threshold $I_1$ is set to a value that is lower than a first current that results from applying the nominal voltage $V_N$ to the glow plug at a minimum temperature threshold, and the lower threshold $I_2$ is set to a value that is higher than a second current that results from applying the nominal voltage $V_N$ to the glow plug at a maximum temperature threshold.

16. The glow plug system of claim 15, wherein the maximum temperature threshold is less than 1400° C. and the minimum temperature threshold is greater than 1000° C.

17. The glow plug system of claim 15, wherein the maximum temperature threshold corresponds to a temperature that permits a cycle life of at least 200 cycles for the glow plug.

18. The glow plug system of claim 11, wherein increasing the glow plug voltage $V_{GPL}$ and decreasing the glow plug voltage $V_{GPL}$ each comprises switching between constant voltage levels.

19. The glow plug system of claim 11, wherein increasing the glow plug voltage $V_{GPL}$ and decreasing the glow plug voltage $V_{GPL}$ each comprises gradually varying the glow plug voltage $V_{GPL}$.

20. The glow plug system of claim 11, wherein a difference between the upper threshold $I_1$ and the lower threshold $I_2$ is one of 3 A, 2 A, 1 A, 0.5 A, 0.25 A, 0.1 A and 0.05 A.

* * * * *